Patented Apr. 27, 1937

2,078,387

UNITED STATES PATENT OFFICE 2,078,387

DIAZO AMINO COMPOUNDS

Jean Georges Kern, Hamburg, N. Y., assignor to E. I. du Pont de Nemours & Company, Wilmington, Del., a corporation of Delaware No Drawing. Application October 20, 1934, Serial No. 749,277

13 Claims. (Cl. 260—69)

This invention relates to water soluble diazoamino compounds especially suitable for use in dyeing and printing textiles. More particularly it relates to compounds having the general formula:

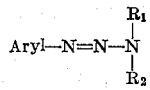

in which formula $R_1$ represents hydrogen, alkyl, hydroaryl, alkylol or hydroarylol, and $R_2$ represents alkylol or hydroarylol, or $R_1$ and $R_2$ together represent a tetramethylene or pentamethylene chain substituted by one or more hydroxyl groups. As examples of aryl nuclei, radicals, residues or groups covered by the term "aryl" in the above formula which are especially suitable for attaining the objects of this invention, mention may be made of the radicals of the benzene, naphthalene, anthracene, diphenyl, diphenyl-ether, diphenyl-sulfide, diphenyl-amine, diphenylene-oxide, carbazole, azo-benzene and anthraquinone series. The term "aryl" in the aforementioned formula covers nuclei containing substituents, for example alkyl, alkoxy, halogen, nitro, acyl-amino, carboxylic acid, sulfonic acid and the like.

This application is a continuation in part of my parent application Serial No. 566,318, filed October 1, 1931.

The preparation of diazo-amino compounds by the reaction of diazonium salts with certain secondary aliphatic amines has been described in the chemical literature. See for example, Baeyer & Jaeger (Ber. 8, 148,893), P. Griess (Ber. 10, 525), and Wallach (Annalen 235, 233). The secondary amines utilized by these investigators contained no alcoholic hydroxyl groups and for this reason are ill-suited to the purposes for which the compounds produced according to this invention are readily adaptable.

This invention has for an object the preparation of novel diazo-amino compounds which were readily soluble in water. Other objects are the preparation of diazo-amino compounds which are useful in the dyeing and printing of textiles with azo dyes; the preparation of diazonium salt derivatives of unusual stability, which may be reverted readily to the parent diazo salts under the influence of mild acids; and the preparation of carbon compounds in a very desirable physical form and in a high state of purity. A general advance in the art and other objects which will appear hereinafter are also contemplated.

The foregoing objects and related ends are accomplished in a manner set out in the following description in which details of what is believed to be the best mode for carrying out the invention are disclosed.

Specifically one method for accomplishing the aforementioned objects and obtaining the newly discovered products is by diazotizing a primary aryl-amine and reacting the diazonium salt thus obtained with a primary or secondary amine of the general formula:

(in which $R_1$ and $R_2$ have the aforementioned significance) in the presence of an acid binding agent, for example, sodium acetate, potassium carbonate, sodium hydroxide and the like.

The resulting diazo-amino compounds may be isolated by various methods, among which may be mentioned evaporation of the reaction mass to dryness under reduced pressure; filtration after the addition of an agent which will precipitate the diazo-amino compound in a filterable form, for example, sodium chloride, potassium sulfate and the like. Equivalent methods will be apparent to those skilled in the art.

The invention will be further understood by a consideration of the following detailed description and illustrative specific examples in which the quantities are given in parts by weight.

Example I

Fifteen and two-tenths (15.2) grams meta-nitro-p-toluidine are stirred in 65 cc. of water for about one-half hour, 30 cc. of concentrated hydrochloric acid added and the mixture stirred for one hour. The solution is cooled to 5° C., 7 grams of sodium nitrite dissolved in 20 cc. water slowly added, stirred for twenty minutes, and filtered. Sixteen (16) grams di-ethanol-amine dissolved in 50 cc. water are then slowly added and the precipitate, in the form of long fine needles, filtered off and dried. The new diazo-imino compound, when purified by recrystallization from water, has a melting point of 77.5–78° C.

Example II

Sixteen and eight-tenths (16.8) grams p-nitro-o-anisidine are diazotized and combined with di-ethanol-amine as described in Example I. The new diazo-imino compound, when purified by recrystallization from water, is obtained in the form of long yellow needles, melting at 127°–128° C.

Example III

Sixteen and two-tenths (16.2) parts of 2,5-dichloro-aniline were stirred with 25 parts of hydrochloric acid of 30% strength, the temperature being raised to about 75° C. to convert the base to the hydrochloride. Enough ice was then added to lower the temperature to 0°–5° C. The amine was diazotized by the addition of a solution of 7 parts of sodium nitrite in 20 parts of water. The diazonium salt solution was filtered to remove small quantities of insoluble matter. Twelve (12) parts of di-ethanol-amine were diluted with 50 parts of water containing 10 parts of sodium carbonate. The filtered diazonium salt solution was added with stirring, additional sodium carbonate being added to maintain distinct alkalinity. After the addition was complete the mass was stirred for 20 minutes, enough sodium chloride added to give a total salt concentration of 20% by weight, and the precipitated diazo-amino compound separated by filtration. The filter cake was washed with enough ice water to remove adhering mother liquor, then dried at 50° C. The new product is a pale yellow solid melting at 104°–106° C.

In a similar manner, new diazo amino compounds especially suitable for use in the printing of the so-called "ice colors" were prepared by diazotizing the following aryl-amines and reacting the diazonium salts thus produced with the indicated alkylol-amines.

| Arylamine | Alkylolamine |
| --- | --- |
| Meta-nitro-para-toluidine | Di-ethanol-amine |
| Para-nitro-ortho-anisidine | Di-ethanol-amine |
| Para-nitro-ortho-anisidine | Mono-ethanol-amine |
| Dichlor-aniline | Di-ethanol-amine |
| Dichlor-aniline | Di-propane-di-ol-amine |
| Dichlor-aniline | Methyl-ethanol-amine |
| Benzidine | Di-ethanol-amine (1 mol.) |
| Benzidine | Di-ethanol-amine (2 mols) |
| Di-anisidine | Di-ethanol-amine (2 mols) |

In the manner described in the specific examples representative aryl-amines were converted to the corresponding diazonium salts from which the new diazo-amino compounds were produced. Other aryl-amines as will be clear may be similarly treated. Among these the following merit special mention:

Ortho-chloro-aniline
Meta-chloro-aniline
4-Nitro-2-amino-toluene
4-Chloro-2-amino-toluene
3-Nitro-4-amino-toluene
5-Nitro-2-amino-anisole
3-Nitro-4-amino-anisole
4-Amino-6-benzoylamino-1,3-xylene
4'-Ethoxy-4-amino-diphenylamine
Di-anisidine
4,4'-Diamino-diphenyl-ether
4-Benzoylamino-2,5-dimethoxy-aniline
Alpha-amino-anthraquinone
3-Amino-carbazole
Para-methyl-ortho-nitro-benzene-azo-cresi-dine
4,4'-diamino-diphenylamine
Sulfanilic acid
Aniline
Amino-azobenzene
2,5-Di-chlor-aniline
Benzidine
4-Chloro-2-amino-benzoic acid
Para-nitro-aniline
2,5-Di-methoxy-aniline
Alpha-naphthylamine
4,4'-Di-amino-diphenyl-sulfide, and
4-Nitro-2-amino-anisole (para-nitro-ortho-anisidine)

In like manner, primary and secondary amines conforming to the general formula given above, other than those utilized as stabilizing agents in the preparation of the diazo-amino compounds in the specific examples, warrant special mention. Among these are:

Methyl-(beta-hydroxy-ethyl)-amine
Methyl-(beta-hydroxy-propyl)-amine
Methyl-(2-hydroxy-cyclo-hexyl)-amine
Butyl-(beta-hydroxy-ethyl)-amine
Cyclo-pentyl-(beta-hydroxy-ethyl)-amine
Cyclo-hexyl-(beta-hydroxy-ethyl)-amine
(Beta-methoxy-ethyl)-(beta-hydroxy-ethyl)-amine
Methyl-(beta,gamma-di-hydroxy-propyl)-amine
Propyl-(beta,gamma-di-hydroxy-propyl)-amine
Di-ethanol-amine
Di-(beta,gamma-di-hydroxy-propyl)-amine
Di-(4-hydroxy-cyclo-hexyl)-amine
Gamma-hydroxy-piperidine
Alpha-hydroxy-pyrrolidine
Alpha-methyl-alpha'-hydroxy-piperidine
Mono-ethanol-amine
Beta,gamma-di-hydroxy-propyl-amine, and
Ortho-amino-cyclo-hexanol.

Mixtures of the primary and secondary amines may be used as stabilizing reagents if found desirable. In some cases lower costs alone warrant the utilization of mixtures. Unfractionated mixtures of mono- and di-ethanol-amines resulting from the particular mode of their production, serve as examples of such lower cost mixtures.

In the preparation of the diazo-amino compounds according to this invention, the first step, which comprises diazotizing the parent aryl-amine, is a process well known in the art. Reaction of the diazonium salts thus obtained with the primary or secondary amine to produce the new diazo-amino compounds is effected in an aqueous medium in the presence of an acid binding agent. Normally a sufficient quantity of acid binding agent is used so that the medium is maintained alkaline during the entire condensation process.

The diazo-amino compounds may be isolated by numerous well known methods, depending upon the solubility characteristics of the individual compounds. Where the compound is very soluble it is best isolated by evaporating the entire reaction mass to dryness under reduced pressure. The diazo-amino product thus obtained is contaminated with inorganic salts. It may be purified by extracting with alcohol, filtering off the inorganic salts insoluble in this medium, and again evaporating to dryness.

In the instances where the diazo-amino compounds are less soluble, isolation may conveniently be effected by the addition of agents such as sodium chloride, sodium sulfate, potassium chloride and the like, to the finished reaction mass and filtering the diazo-amino compounds which separate as crystalline solids. If necessary, the diazo-amino bodies may be purified by crystallization from water or other suitable solvents such as alcohols, glycols, glycol-ethers and the like. The products should be dried at moderate temperatures, usually at 80° C. or lower. Especially good results are obtained by drying the products in vacuo at 40–60° C.

The new diazo-amino compounds are appreciably soluble in water and exhibit good stability toward alkalies. This property makes them especially desirable for use in textile dyeing and printing processes. These compounds are hydrolyzed by acids, resulting in regeneration of the diazonium salts and primary or secondary amines. At ordinary temperatures this reaction proceeds rapidly in the presence of strong mineral acids but very slowly in the presence of weaker acids, particularly in dilute solutions of weak acids. At higher temperatures the rate of hydrolysis is greatly increased. For example, hydrolysis with a 5% acetic acid solution at room temperature is extremely slow, but at the boiling point, hydrolysis is complete within a few minutes. The ease of hydrolysis, of course, is a function of the constitution of the given compound.

The diazo-amino compounds obtained from negatively substituted aryl-amines such as 2,5-di-chloro-aniline and meta-nitro-aniline are, in general, more resistant to hydrolysis than similar compounds produced from aryl-amines containing positive substituents for example, meta-xylidine and 4-benzoyl-amino-2,5-di-ethoxy-aniline. Where both types of substituents are present in the same molecule each type tends to counter-balance the effect of the other. Examples of such aryl-amines are 4-chloro-2-amino-toluene and 4-chloro-2-amino-anisole. Similarly, the solubility in water of the diazo-amino compounds varies somewhat in accordance with their constitution. However, all of the products of the present invention exhibit sufficient stability to make them useful in the production of azo colors.

The term "alkylol" as used herein covers hydroxy and poly-hydroxy-alkyl residues or radicals.

The products of the present invention find their greatest use in the production of ice colors by so-called "one-bath" processes. In such processes the diazo-amino compounds are mixed with approximately equivalent quantities of ice color coupling components and made into pastes. Textile fibers are impregnated with these alkaline pastes and then subjected to the action of mild acids at elevated temperatures. The acid treatment regenerates the diazonium salts which immediately couple with the coupling components forming the insoluble colors on the fiber.

The products of the present invention are particularly attractive from the economic point of view because the primary and secondary amines used in their preparation, particularly di-ethanol-amine, are manufactured in quantity by economical methods. The diazo-amino compounds are obtained in excellent yield and in a high state of purity with a minimum number of chemical operations. For this reason they provide a new series of intermediates for the production of ice colors at especially low cost.

As many apparently widely different embodiments of this invention may be made without departing from the spirit and scope thereof, it is to be understood that I do not limit myself to the specific embodiments thereof as defined in the appended claims.

I claim:

1. The reaction product formed by coupling a diazotized aromatic amino compound and an alkylolamine from the group consisting of mono- and di-alkylol-amines.

2. The reaction product formed by coupling a diazotized aromatic amino compound and a di-alkylol-amine.

3. The reaction product formed by coupling a diazotized aromatic amino compound and a mono-alkylol-amine.

4. The reaction product formed by coupling a diazotized aromatic amino compound and di-ethanol-amine.

5. The reaction product formed by coupling a diazotized aromatic amino compound and mono-ethanol-amine.

6. The reaction product formed by coupling a diazotized aromatic amino compound and a mixture of mono- and di-alkylol-amines.

7. The reaction product formed by coupling a diazotized aromatic amino compound and a mixture of mono- and di-ethanol-amines.

8. The reaction product formed by coupling a diazotized aromatic amine of the group consisting of the primary amines of benzene, naphthalene, anthracene, diphenyl, diphenyl-ether, diphenyl-sulfide, diphenyl-amine, diphenylene oxide, carbazole, azo-benzene and anthraquinone series with an alkylolamine having at least one hydrogen atom joined to the amine nitrogen atom.

9. The reaction product formed by coupling a diazotized aromatic amino compound and an ethanolamine from the group consisting of mono- and di-ethanolamines.

10. The reaction product formed by coupling with an alkylolamine having only one hydrogen atom joined to the nitrogen atom of the alkylol-amine, a diazotized amine in which the amino radical is attached to a benzene nucleus.

11. Diazo amino compounds possessing the following formula:

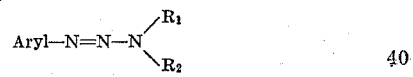

in which aryl represents an aryl nucleus, while $R_1$ consists of the grouping hydrogen, an alkyl, hydroxy alkyl, or polyhydroxy alkyl radical, and $R_2$ consists of the grouping hydroxy alkyl or polyhydroxy alkyl radical.

12. Diazo amino compounds possessing the following formula:

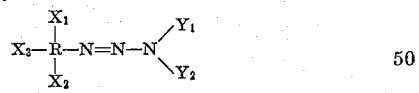

in which R represents an aryl nucleus, $X_1$, $X_2$ and $X_3$ represent positive substituents or hydrogen, $Y_1$ consists of the grouping hydrogen, an alkyl, hydroxy alkyl, or polyhydroxy alkyl radical, and $Y_2$ consists of the grouping hydroxy alkyl or polyhydroxy alkyl radical.

13. Diazo amino compounds possessing the following formula

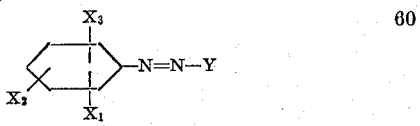

in which $X_1$, $X_2$ and $X_3$ represent positive substituents or hydrogen and Y consists of the group mono-ethanol or di-ethanol amine.

JEAN GEORGES KERN.